Figure 1:
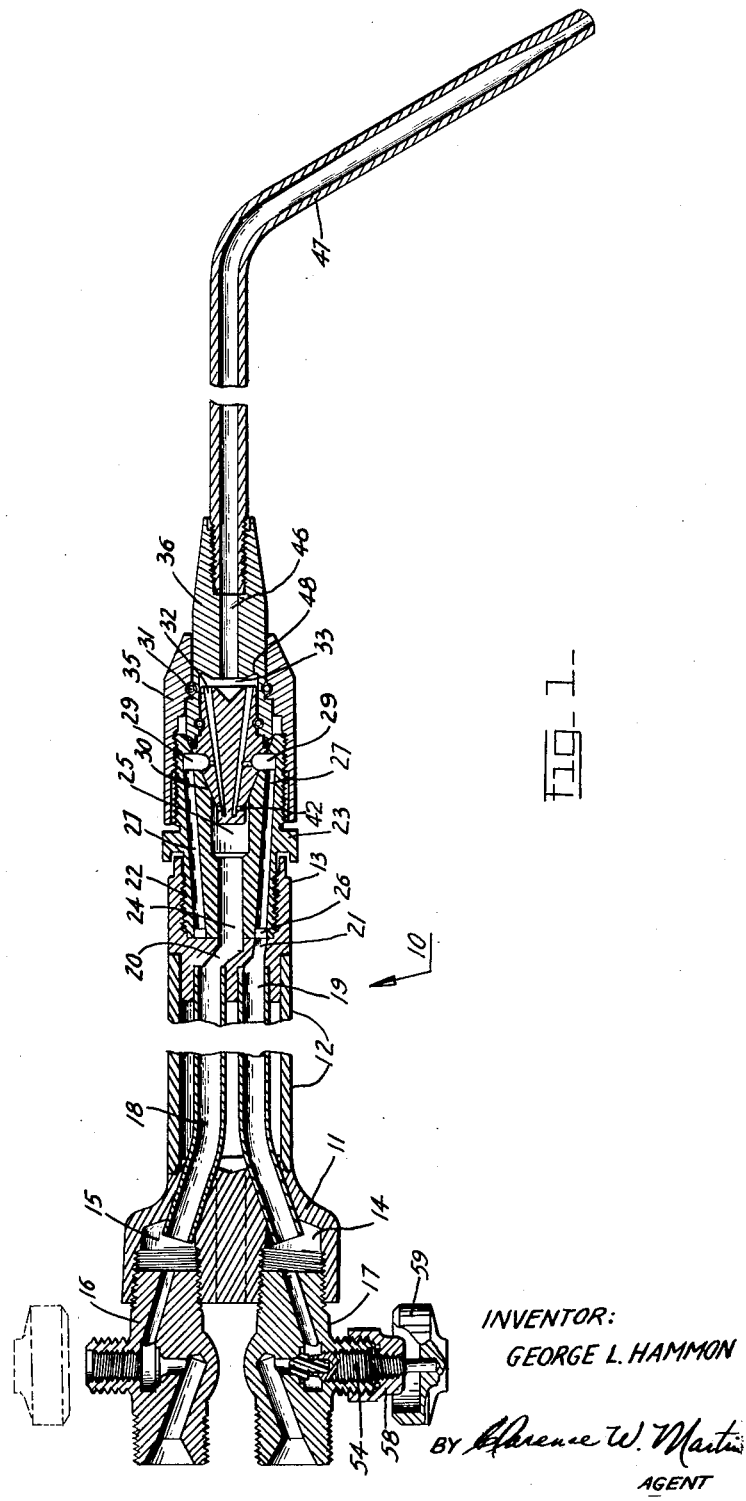

June 19, 1962  G. L. HAMMON  3,039,521
GAS TORCHES

Filed July 16, 1958  2 Sheets-Sheet 1

INVENTOR:
GEORGE L. HAMMON
BY Clarence W. Martin
AGENT

June 19, 1962 G. L. HAMMON 3,039,521
GAS TORCHES
Filed July 16, 1958 2 Sheets-Sheet 2
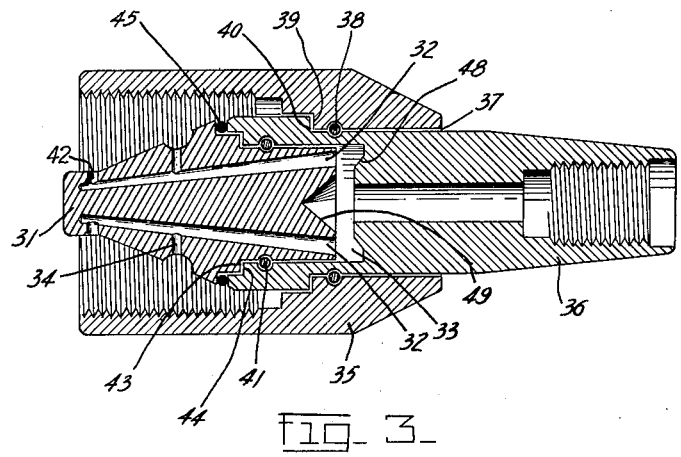
fig_3_
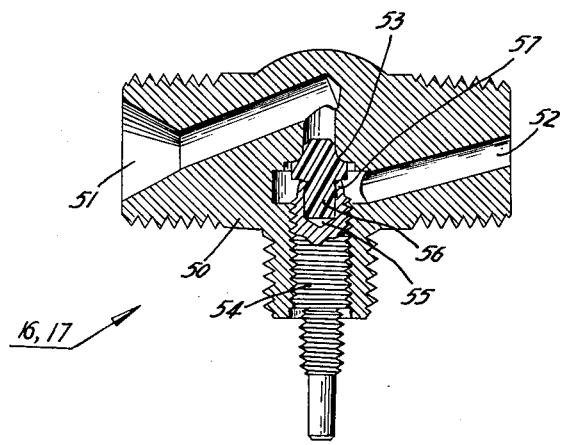
fig_2_
INVENTOR:
GEORGE L. HAMMON
BY Clarence W. Martin
AGENT

# United States Patent Office 3,039,521
Patented June 19, 1962

3,039,521
GAS TORCHES
George L. Hammon, 32 Ross Circle, Oakland, Calif.
Filed July 16, 1958, Ser. No. 748,995
1 Claim. (Cl. 158—27.4)

The present invention relates to gas welding torches and particularly concerns improvements which make it possible for one torch to serve for a wide range of gas pressures.

Gas torches generally include a mixer unit for mixing oxygen and acetylene gas, a pair of valves for regulating the flow of the two gases to the mixing unit, and a gas tip through which the mixed gases are conveyed and then ignited.

The mixer unit normally is constructed as a part separate from the main torch housing and comprises both oxygen and acetylene receiving ports which, when the mixer unit is assembled and fastened to the torch body, are aligned with respective gas input tubes. Manually adjustable valves control the flow of gases through the tubes to the mixer unit. No mixing of the gases should occur before the gases are properly mixed in the mixer unit; therefore it has been necessary to provide proper mating surfaces between the mixer unit and the torch housing so that the gases cannot leak around the mixer unit. A previous method of attempting to insure against such leakage has been to employ sealing rings between the mixer unit and the torch housing; however since the mixer units generally have been made integral with, or fixed to the tips, and since different tips and mixer units employed are used according to the welding requirements and/or gas pressures used, the pressure rings become deformed due to frequent interchanging and handling with the result that leakage of gas occurs around the mixer unit. Such leakage is undesirable not only because it inhibits the proper functioning of the mixer unit, but also because it presents a hazard to the worker.

When oxygen is mixed with acetylene the mixture is explosive, and on occasion a backfire results within the welding tip. Such backfire is hazardous within itself but normally is confined within the torch; however, if a leakage of gas occurs around the mixer unit, then since oxygen normally is under greater delivery pressure than the acetylene, the oxygen backs up into the acetylene hoses and upon backfire, the delivery hoses may explode thus leading to the other more hazardous conditions.

Furthermore, welders frequently wish to adjust the angle of the tip, but this is impossible without also adjusting the mixer unit. This is not only an inconvenience but results in excess wear and tear on the mixer unit and its seals.

Another shortcoming of welding torches has been in that the torches do not readily permit a reduction in the gas pressure between the delivery hoses and the tip with the result that when an operator is working under conditions involving high gas pressure, it is difficult to light the torch without the torch blowing itself out.

A main object of the invention is to provide a gas torch which operates safely over a wide range of gas pressures.

Another object is to provide a gas torch having a soft flame for easy lighting regardless of the gas delivery pressure to the torch.

Another object is to permit adjustment of the burning tip without causing movement of the mixer unit.

Still another object is to provide an improved gas valve which permits a slowly gradually increasing rate of gas flow upon initial opening of the valve.

A further object is to control the rate and direction of gas flow through the mixer unit in such manner the hazards of backfire are substantially eliminated.

A preferred embodiment of the invention is given by way of example only as variations will occur to those skilled in the art from the following description in which:

FIGURE 1 is a side view, in section, of the torch;
FIGURE 2 is an enlarged sectional view of a manually adjustable valve; and
FIGURE 3 is an enlarged sectional view of the mixer unit as seen from the opposite side of that shown in FIGURE 1.

Referring to FIGURE 1, the housing 10 comprises a plurality of sections 11, 12 and 13 which are separately manufactured but permanently attached in the well known manner to form the housing 10. Section 11 includes a pair of internally threaded gas inlet ports 14 and 15 into which are tightly threaded an oxygen valve 16 and an acetylene valve 17, respectively.

The tube portion 12 forms the handle of the torch and is connected to sections 11 and 13 to form a protective housing for a pair of tubes 18 and 19. Tube 18 conveys oxygen from the inlet port 15 to a port 20 in the housing section 13.

Housing 13 is internally threaded on its right end as at 22 to receive a gas distributor 23. The leftmost end of the distributor has an aperture 24 in alignment with the leftmost end of port 20 and, since the left face of distributor 23 is tightly screwed against a corresponding right face of housing 13, the aperture 24 serves as a continuing path for the oxygen to an oxygen distributing chamber 25.

A slightly different arrangement is provided for the distribution of the acetylene. An annular ring 26 is cut in the left face of the distributor 13 for distributing acetylene from the port 21 to a plurality of tubes 27 which are drilled within the distributor. While only two tubes 27 are shown, it is preferable to provide a greater number of tubes to insure an adequate flow of acetylene. Tubes 27 open into an annular ring 29 formed near in the right end of the distributor 23.

The internal face of the right end of distributor 23 is tapered inwardly as at 30 from the annular acetylene ring 29 to the oxygen chamber 25 to form a frusto-conical walled cavity, and closely abutting this tapered face is a mating surface of a mixer unit 31 having a frusto-conical walled surface. It is essential that there shall be no escapement of oxygen from chamber 25 into ring 29, or else the two gases will mix in the acetylene tubes since the oxygen generally is under greater pressure than the acetylene.

Previously such mixing was prevented by compressing a sealing ring between the two mating surfaces mentioned above; however, the sealing rings became deformed with use, especially since the mixing unit was subject to movement whenever the tip was changed or turned to a new angle. According to the present invention a large area metal to metal surface is provided between the mixer unit 31 and the distributor 23 to prevent such escapement of gases. Since the mixer unit 31 is provided as a unit separate from the burning tip 47, the tip can be subjected to interchange or adjustment without affecting the mixer unit or the gas seal.

The mixer unit 31 (FIGURES 1 and 3) applies well known principles to effect the mixing of acetylene with oxygen. For this purpose a plurality of tubes 32 are drilled into the mixer body 31, the tubes having communication through an annular recess 42 with the oxygen chamber 25 at the inlet end and having communication with an outlet chamber 33 at the outlet end. The tubes 32 are tapered from a small diameter at the inlet end to a larger diameter at the outlet end. This causes a reduction in pressure within the tubes so that acetylene gas is drawn from the annular recess 29 through respective communication ports 34 into tubes 32 where the acetylene is mixed with the oxygen. From tubes 32 the mixed gases flow into the outlet chamber 33 which has communication with the burning tip 47.

The mixing unit is securely held in place by a lock nut 35 and a tip holder 36 as follows. The tip holder 36 is first inserted through an appropriate opening 37 in the lock nut. A releasable spring clip 38 holds the nut and holder generally in the relationship shown with a shoulder 39 (FIGURE 3) of the nut standing adjacent a shoulder 40 of the holder 36. A releasable spring clip 41 similarly holds the mixer unit 31 within the holder 36 with respective mating shoulders 43 and 44 standing adjacent to each other. A compressible sealing ring 45 is provided at a common junction between the mixer unit 31, the tip holder 36 and the gas distributor 23 (FIGURE 1).

The locknut 35 is then threaded on the distributor 23 and as the units are tightened the sealing ring 45 becomes compressed, but only by a pre-determined amount since the abutment of respective pairs of shoulders 39, 40 and 43, 44 prevents overcompression of the sealing ring. The latter, however serves as a gas seal and also as a yieldable element whenever the tip holder 36 and tip 32 are adjusted to a new angle.

For ease of manufacture, the tip 47 and the holder 36 are made as two parts but are tightly threaded together and formed into an integral unit. From the foregoing it is seen that the position of the tip relative to the handle 12 may be changed under manual pressure without affecting the position of the mixer unit 31 relative to the distributor 23.

Referring now to the flow of the mixed oxygen and acetylene gases from the mixer unit 31 to the tip 47, the following path of flow is designed to create what is commonly known as a soft flame and also to substantially eliminate back fires. If the mixed gases were permitted to feed in a direct line from one of the mixer tubes 32 into the outlet tube 46 of the tip 47 then a high pressure jet stream would be created within the tube 47 regardless of how large the tube 47 might be; according to the present invention, however the gas is transposed into a large volume, low pressure mass which eliminates the jet stream and its attendant drawbacks such as difficulty in lighting a high pressure torch.

For this purpose the tip holder 36 has an annular undercut surface 48 which stands directly opposite the end of the tubes 32 and serves to deflect the mixed gases at an acute angle back against a concave undercut surface 49 formed in the end of the mixer unit. The concave surface in turn again deflects the gases into the expansion chamber 33 where a large volume, lower pressure mass of gas is formed and delivered to the outlet tube 47. This arrangement has been found to produce a soft flame that is not only easy to light but which, due to the large volume, low pressure effect, produced a flame which will not wash the metal during the laying of a bead. Formerly the high pressure jet flame caused the metal adjacent the weld to flow away, thus creating a wash condition in which the wall thickness of the welded metal was decreased.

This condition is prevented by the presently disclosed torch regardless of whether it is operating under conditions of high or low delivery pressures. Furthermore, the deflecting of the gas through two relatively acute angles substantially eliminates the possibility of backfires in back of the mixer unit since the flame in this case would have to follow a roughly described Z course, and flames of this nature have not been found inclined to follow such courses.

Another feature of the present invention is the provision of a valve which opens from a closed condition with a gradual increase in rate of flow of gas to permit lighting of a high pressure torch without blow out. Former known valves have either opened at a constant rate of increase, or in those cases where the increase in rate could be controlled such as needle valves, the structure has been delicate and subject to malfunction.

Both the oxygen and acetylene valves 16 and 17 (FIG. 1) are identical in construction and therefore only one valve will be described. Such a valve is shown in FIGURE 2. The valve includes a main housing 50 having an inlet port 51 and an outlet port 52. The two ports are interconnected by a chamber including a valve seat 53 having a gradually sloping concave annular shoulder.

A valve stem 54 is threaded into the main housing and the lower end thereof is recessed as at 55 to receive the stem 56 of a nylon insert. After the stem 56 is inserted into the recess 55 the wall 57 at the bottom of the stem is rolled over to hold the nylon insert firmly within the recess. The insert includes a pair of convex shoulders which match the convex shoulders 53 of the valve chamber. A conventional lock nut 58 (FIG. 1) and packing are provided to limit the outward movement of the valve stem. The knob 59 is fixed on the valve stem.

When the knob is turned in a direction to open the valve the insert 56 (FIG. 2) is gradually moved upwardly, and while a considerable gap is formed between the horizontally extending arms of the T-shaped insert portion, the vertical stem still substantially fills the constricted area so that the rate of gas flow is very low, and the flame may be lit easily without pop-out; however, as the valve stem is further withdrawn and the vertical position begins to pull away from the converging shoulders, an increasing rate of flow results to permit the operator to bring up the pressure with a minimum of manipulation of the knob. When the valve is closed the nylon insert bears tightly against the restricting walls and if the valve is too tightly closed, the nylon merely compresses without galling either the chamber walls or the stem insert.

Since a short amount of valve stem movement is required to effect full opening and closing of the valve, the ports may be kept to a minimum size thus aiding in preventing the knobs from entangling with clothing and equipment.

From the foregoing description it is evident that the torch of the present invention includes improvements in controlling the gases at the point of entry, in mixing controls and in causing a soft flame through control of the path of gas flow. Furthermore the operator may change the tips independently of the mixing unit, thus diminishing the possibility of damage to the latter.

I claim:

A gas torch having a first valve, a second valve, a torch tip, a gas mixing unit, a first passageway for conveying gas from the first valve to the gas mixing unit, a second passageway for conveying gas from the second valve to the gas mixing unit, said gas mixing unit having a plurality of passageways therein in each of which passageways said two gases are mixed and conveyed to a mixed gas outlet end of the mixing unit, said passageways in said mixing unit being tapered from a relatively small size at a gas entrance end to a relatively larger size at the gas outlet end, a chamber adjacent the mixed gas outlet end of the mixing unit, said chamber being defined in part by a first wall of the torch opposite the outlet end of said mixing unit passageways, a second wall opposite the first wall and formed by a portion of the mixing unit, said chamber formed by said walls having two angular configurations in which the mixed gases from each passageway are twice deflected to form the figure Z in which the lower portion of the Z is enlarged and forms an expansion zone, and conduit means for conveying the mixed and expanded gases from said expansion zone to the torch tip.

References Cited in the file of this patent

UNITED STATES PATENTS

| | | |
|---|---|---|
| 1,261,712 | Crispell | Apr. 2, 1918 |
| 1,444,985 | Smith | Feb. 13, 1923 |
| 1,970,012 | Lurie | Aug. 14, 1934 |
| 1,994,841 | Thomas | Mar. 19, 1935 |
| 2,507,102 | Hammon | May 9, 1950 |
| 2,518,895 | Jacobsson et al. | Aug. 15, 1950 |
| 2,538,916 | Rudolph | Jan. 23, 1951 |
| 2,669,415 | Gilroy | Feb. 16, 1954 |
| 2,702,079 | Smith | Feb. 15, 1955 |